United States Patent
Takahashi

(10) Patent No.: US 7,245,100 B2
(45) Date of Patent: Jul. 17, 2007

(54) MULTI-AXIS AC SERVO CONTROL SYSTEM AND METHOD

(75) Inventor: Toshio Takahashi, Rancho Palos Verdes, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/560,657

(22) Filed: Nov. 16, 2006

(65) Prior Publication Data

US 2007/0069665 A1   Mar. 29, 2007

Related U.S. Application Data

(62) Division of application No. 10/839,045, filed on May 4, 2004, now Pat. No. 7,145,300.

(60) Provisional application No. 60/468,278, filed on May 5, 2003.

(51) Int. Cl.
*G05B 19/18* (2006.01)

(52) U.S. Cl. .................. 318/560; 318/559; 318/257; 318/53; 318/600; 388/809; 388/811; 700/186; 700/187; 700/159

(58) Field of Classification Search .............. 318/560, 318/599, 257, 53, 600; 388/809, 811; 700/186, 700/187, 159
See application file for complete search history.

(56) References Cited

U.S. PATENT DOCUMENTS

| | | | |
|---|---|---|---|
| 3,656,124 A * | 4/1972 | McGee | 700/275 |
| 3,701,888 A | 10/1972 | McDaniel | 318/562 |
| 4,240,016 A | 12/1980 | Inaba et al. | 318/562 |
| 4,614,901 A | 9/1986 | Kullman et al. | 318/89 |
| 4,639,653 A * | 1/1987 | Anderson et al. | 318/599 |
| 4,641,069 A | 2/1987 | Fujioka et al. | 318/625 |
| 4,685,678 A | 8/1987 | Frederiksen | 273/148 B |
| 4,712,052 A * | 12/1987 | Omae et al. | 318/625 |
| 4,772,831 A * | 9/1988 | Casler et al. | 318/568.15 |
| 4,773,025 A * | 9/1988 | Penkar et al. | 700/261 |
| 4,774,441 A | 9/1988 | Toyomasu et al. | 318/102 |
| 4,807,153 A * | 2/1989 | Onaga et al. | 700/256 |
| 4,831,549 A * | 5/1989 | Red et al. | 700/254 |
| 4,859,920 A | 8/1989 | Kurakake et al. | 318/567 |
| 4,883,974 A | 11/1989 | Tinder | 307/10.1 |
| 4,896,260 A | 1/1990 | Hyatt | 711/106 |
| 4,931,712 A | 6/1990 | DiGiulio et al. | 318/625 |
| 4,970,448 A * | 11/1990 | Torii et al. | 318/568.1 |
| 4,990,835 A | 2/1991 | Ohnishi et al. | 318/116 |
| 5,087,864 A | 2/1992 | Abel | 318/34 |
| 5,237,250 A | 8/1993 | Zeile et al. | 318/562 |
| 5,248,922 A | 9/1993 | Meshkat | 318/560 |
| 5,252,902 A | 10/1993 | Uehara et al. | 318/599 |
| 5,268,898 A | 12/1993 | Kazato | 370/447 |
| 5,382,915 A | 1/1995 | Muri et al. | 330/10 |

(Continued)

*Primary Examiner*—Rita Leykin
(74) *Attorney, Agent, or Firm*—Ostrolenk, Faber, Gerb & Soffen, LLP

(57) ABSTRACT

A multiple axis servo control implements a multi-tasking PWM control unit to provide PWM signals for multiple axes in a single unit. A time slice mechanism provides axis selection signals based on a system clock signal to permit control parameters of the selected axis to be processed to control the selected motor drive axis. The single unit PWM control mechanism eliminates complex and costly multiple axis networks typically associated with independent servo motor controls for each axis in a multi-axis system. A single PWM unit implementation also permits the reduction of components for closed loop current control and closed loop velocity control in the multi-axis servo control system.

16 Claims, 4 Drawing Sheets

U.S. PATENT DOCUMENTS

| | | | |
|---|---|---|---|
| 5,926,389 A * | 7/1999 | Trounson | 700/187 |
| 6,057,664 A | 5/2000 | Ikawa et al. | 318/811 |
| 6,188,190 B1 | 2/2001 | Arakawa | 318/560 |
| 6,278,910 B1 | 8/2001 | Miura et al. | 700/297 |
| 6,294,957 B1 | 9/2001 | Luu | 330/251 |
| 6,297,610 B1 | 10/2001 | Bauer et al. | 318/562 |
| 6,297,612 B1 | 10/2001 | Shloush et al. | 318/569 |
| 6,339,302 B1 | 1/2002 | Greenbank et al. | 318/103 |
| 6,344,719 B2 | 2/2002 | Shibazaki et al. | 318/34 |
| 6,362,593 B1 | 3/2002 | Lee | 318/801 |
| 6,552,607 B1 | 4/2003 | Danielson | 330/10 |
| 6,583,591 B2 | 6/2003 | Echols et al. | 318/112 |
| 6,713,983 B2 | 3/2004 | Maruyama | 318/560 |
| 6,774,599 B2 * | 8/2004 | Ishii | 318/652 |
| 6,806,660 B2 | 10/2004 | Fujisaki et al. | 318/113 |
| 6,819,070 B2 | 11/2004 | Kerkman et al. | 318/434 |
| 6,825,634 B2 | 11/2004 | Tatar et al. | 318/625 |
| 6,826,450 B2 | 11/2004 | Watanabe et al. | 700/245 |
| 6,981,417 B1 * | 1/2006 | Oravecz | 73/619 |
| 6,989,646 B2 * | 1/2006 | Jackson et al. | 318/645 |
| 2002/0117980 A1 | 8/2002 | Echols et al. | |
| 2005/0093501 A1 | 5/2005 | Takahashi et al. | 318/568.13 |
| 2005/0146712 A1 | 7/2005 | Kopelovitz et al. | 356/73.1 |

* cited by examiner

MULTI-AXIS AC SERVO CONTROL SYSTEM AND METHOD

RELATED APPLICATION

The present application is a Divisional Application of Ser. No. 10/839,045 filed May 4, 2004 now U.S. Pat. No. 7,145,300, and claims priority of U.S. provisional application No. 60/468,278, filed May 5, 2003, incorporated by reference.

BACKGROUND OF THE INVENTION

1. Field of the Invention

The present invention relates generally to multi-axis servo drive controls, and relates more particularly to a system and method for multi-axis motion control through a single PWM unit.

2. Description of Related Art

A number of servo motor drive applications have specific requirements for multiple axes with high precision coordinated position control. For example, in the fields of robotics, electronic CAM and wafer handling, multiple-axis motion control provides coordinated three dimensional position control. Servo drive application controls are available for multi-axis motion control realized through multiple servo amplifiers with each axis unit containing an independent PWM unit, an independent closed loop current control and an independent closed loop velocity control. Each of the servo amplifiers are typically connected to a network system with a host that performs multi-axis coordinated position control, such as axis interpolation and other coordinated position control applications. The network system for the multi-axis control is often complex and somewhat expensive, since a network protocol must be implemented to permit control messages to be transmitted simultaneously, or in a synchronous communication technique to provide high speed response or real-time control. Due to the number of parameters communicated in the control messages, the communication network can be overburdened or somewhat costly when a network with a large amount of resources is used.

A typical AC servo drive system contains a closed loop current control and a velocity control. In a digital AC servo system, these controls are traditionally implemented in software. Each loop control typically has a different update rate because the dynamics of the control objectives for each control loop are different. For example, closed loop current control typically attempts to control motor torque indirectly by controlling motor phase current. The velocity control loop controls motor speed, typically with a feedback signal representing rotor speed for the motor. Torque is a high dynamic parameter, with a quick response time when compared with motor speed. Accordingly, closed loop current control is typically operated with an update rate that is much faster than that of the velocity control loop. As a typical example, closed loop current control update rates are often on the order of approximately 100 microseconds, where closed loop velocity control rates are typically 400 microseconds. The computation time for each of the control loops should be much less than the update rate for the practical implementation of the closed loop current control. For example, the closed loop current control computation time should be approximately 50 microseconds or less.

Traditional servo control methods are based on a microprocessor or a digital signal processor (DSP) that do not provide multiple axis servo drive functionality. Servo control techniques typically involve the use of a pulse width modulated (PWM) signal to drive the motor inverter switches to provide appropriate power in the windings of the motor to realize the specific servo control. However, traditional microprocessors and DSPs are provided with a PWM unit as a piece of hardware logic that is designed and implemented for single axis servo motor control. Accordingly, multi-axis servo control systems using traditional microprocessors or DSPs are implemented with a single microprocessor or DSP for each axis of the multi-axis servo control system. That is, each axis of the multi-axis servo control system has a dedicated PWM unit for controlling the switches in the inverter drive.

Referring to FIG. 1, a diagram of a traditional multi-axis servo drive system 10 is illustrated. Microprocessor or DSP 11a, 11b and 11c control individual servo axes 15a, 15b and 15c, each with an inverter drive 16a, 16b and 16c operated with a PWM unit in processor 11a, 11b or 11c, respectively.

A network 12 acts to coordinate operation of each of the servo axes under the direction of a host system 13. Network 12 interfaces with each servo axis control through a network interface 14a, 14b or 14c, respectively. Host system 13 provides coordination for the various axes by delivering commands for motion control and reading feedback data to determine parameters such as velocity and position, for example. Accordingly, the efficient operation of network 12 is important for sophisticated multi-axis servo control according to a traditional system. Host system 13 typically initiates motion coordination through network 12 by providing network messages to each controlled servo axis drive. Each servo drive, or amplifier, includes a self contained closed loop current control with PWM hardware and a velocity control. This traditional technique of providing a multi-axis servo control by coordinating a number of individual servo drives, each with a PWM unit, a power converter and several feedback loops including current sensing devices has long been used as a standard configuration for providing multi-axis servo control.

Referring now to FIG. 2, a traditional three-phase PWM unit 20 for a single axis servo control is illustrated in block diagram format. Unit 20 provides PWM signals for a single servo axis control. PWM unit 20 receives phase voltage commands for each of the phases U, V and W. The phase voltage commands are placed in a respective register 21a, 21b or 21c for each phase of the servo control. Each time a phase voltage command is updated, it is written into a respective phase register 21a–21c. At the beginning of a PWM cycle, the register values in registers 21a–21c are loaded into a respective corresponding synchronized secondary register 22a–22c. The synchronized secondary register values are compared against the PWM carrier frequency waveform generated in an up/down counter 23.

The resulting PWM waveforms from the comparison of the phase voltage commands and the carrier frequency command is applied to a deadtime insertion logic block 23a, 23b and 23c, for each of the respective motor phases. The inserted deadtime for the PWM signals is derived from the deadtime command also provided through a primary and secondary register. The output of deadtime insertion logic blocks 23a–23c is applied to gate enable logic block 24, which is influenced by the PWM enable signal and the digital filter signal applied to gate enable logic block 24. The PWM enable signal is applied through a primary and secondary register, similar to the other servo drive commands. The digital filter signal is obtained from digital filter block 25, which contains various filter parameters and a filter state that may change with each cycle of the digital control.

Gate enable logic 24 outputs the gate control signals for the switches in the inverter drive of the single axis servo control, designated as high and low signals for each of the motor phases, to control the high and low switches supplying electrical energy to each of the motor phases. PWM unit 20 accordingly provides a PWM control based on synchronous, digital logic and various servo drive controls provided from host system 13 over network 12. As shown in FIG. 1, PWM unit 20 occupies a specific portion of each of processors 11a–11c. Other portions of processors 11a–11c read sensory information from current and position feedback sensors and close the current control loop and the velocity control loop for the axis under the control of the particular processor 11a–11c.

It would be desirable to obtain a control for a servo drive system with multiple axes that simplifies the interaction with the host system and the servo axis controllers. It would also be desirable to reduce the redundancy in the multi-axis servo control system where each servo axis is provided with an independent controller.

SUMMARY OF THE INVENTION

In accordance with the present invention, there is provided a single PWM unit to control multiple axes of a servo motor drive control system. The system and method of the present invention combines and consolidates redundant hardware into a single unit and provides a multi-tasking engine to share the resources of the single unit among a number of motor drive axes. The control elements may be realized in a hardware implementation and provides real time servo drive operation control.

A system and method according to the present invention serves to simplify the control system used to operate multiple axes, and consequently simplifies communication with a host system, since the host communicates with a single hardware unit rather than multiple servo motor drive controls. Accordingly, the complexity and specialized protocols and synchronization of a real time networking system for servo motor control with multiple axes can be eliminated.

A single PWM unit provided by the present invention produces controls for a multi-axis servo control by permitting each resource dedicated to a particular axis to operate on a time slice of an overall system control period. A high frequency clock signal is used to drive the single PWM system to permit multiple axes to share the control resources with each axis assigned to a given time slice. Accordingly, the PWM unit provides parameter storage for the multiple axes, and sequences through each axis according to the selected time slice to provide the appropriate axis control.

Other features and advantages of the present invention will become apparent from the following description of the invention which refers to the accompanying drawings.

DETAILED DESCRIPTION OF THE PREFERRED EMBODIMENTS

Figure 1:
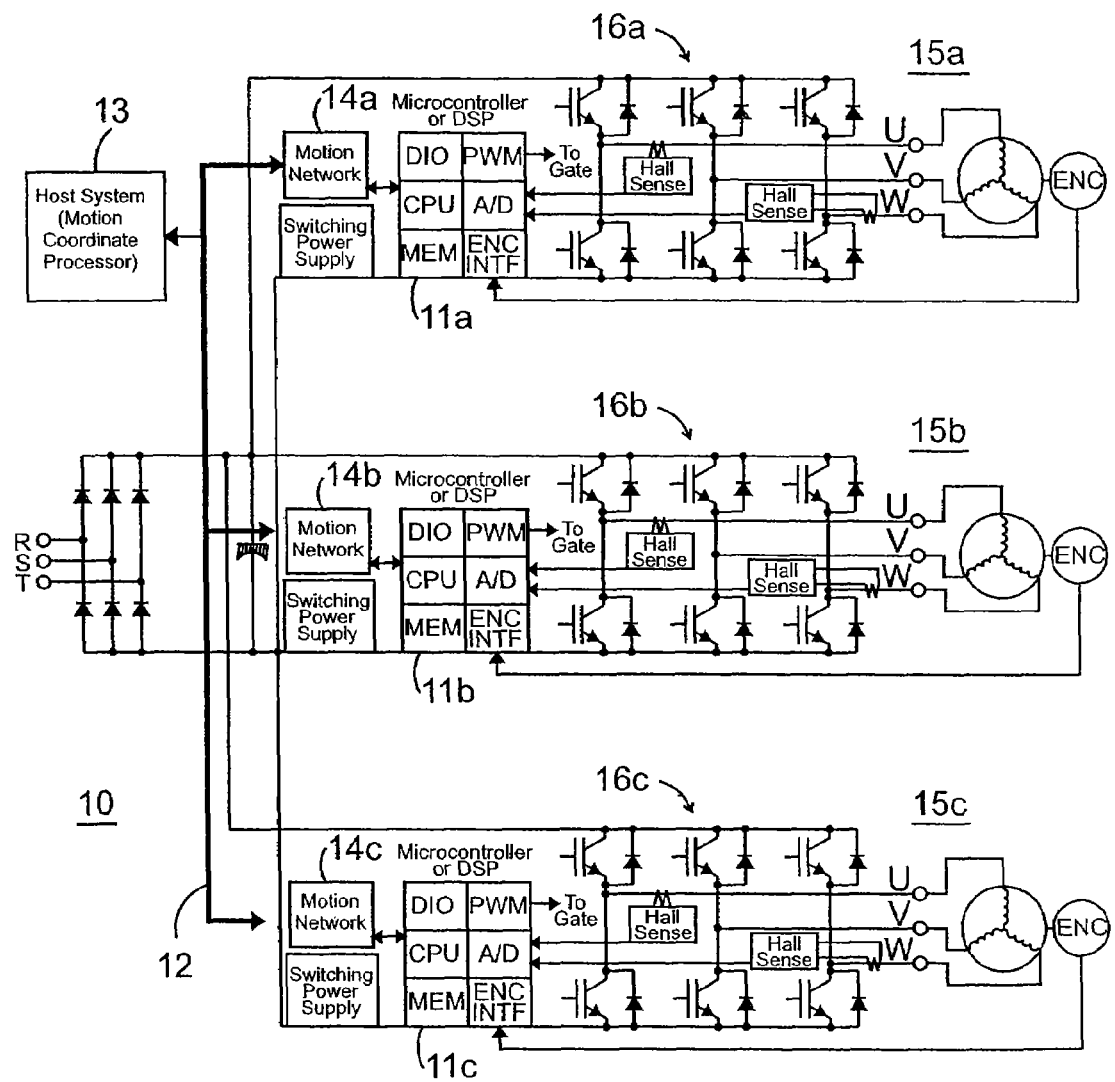
FIG. 1 is a block diagram schematic of a conventional multi-axis servo control configuration.
Figure 2:
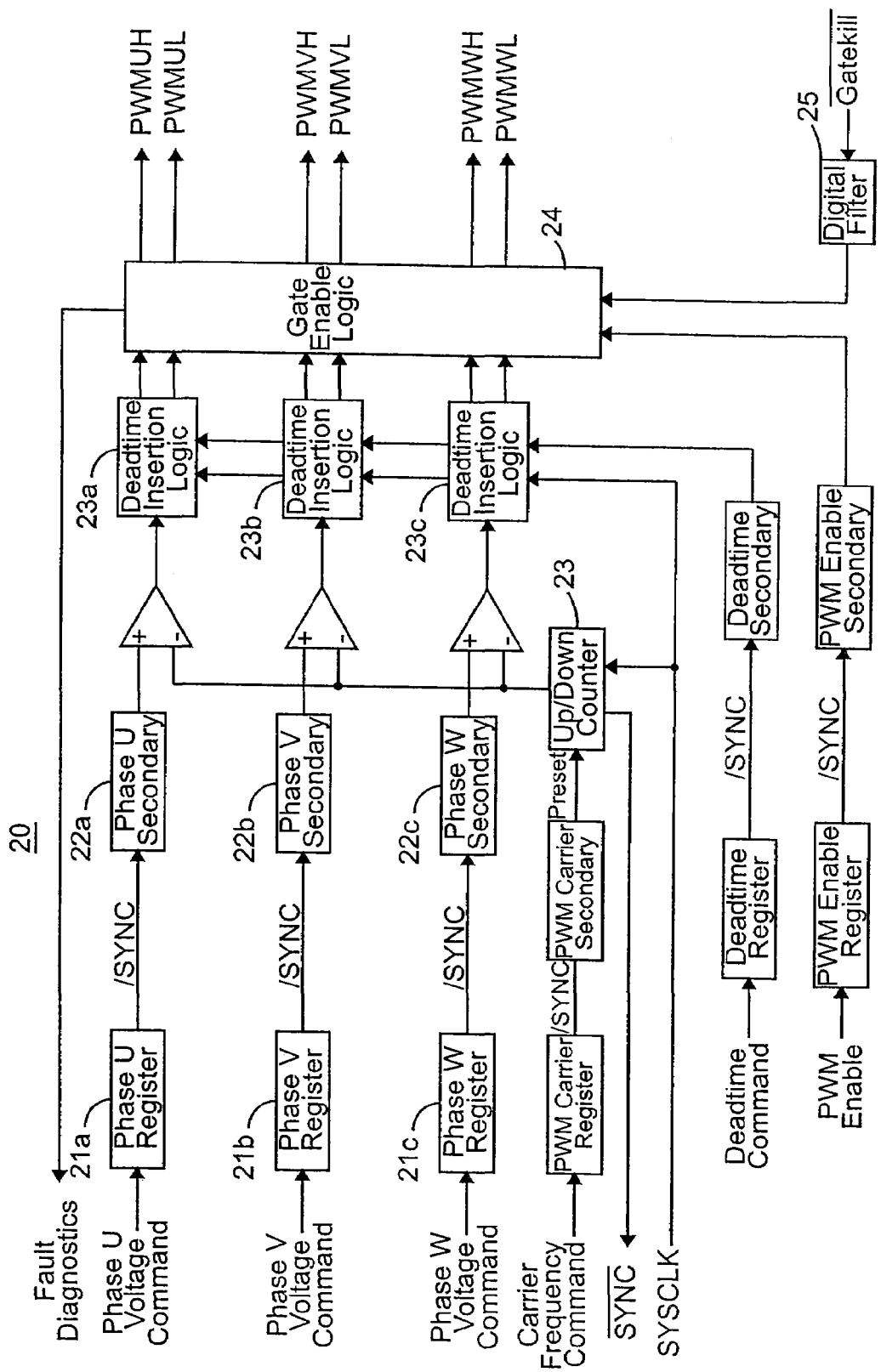
FIG. 2 is a schematic block diagram of a convention PWM unit for driving a single axis of a multi-axis servo control system.
Figure 3:
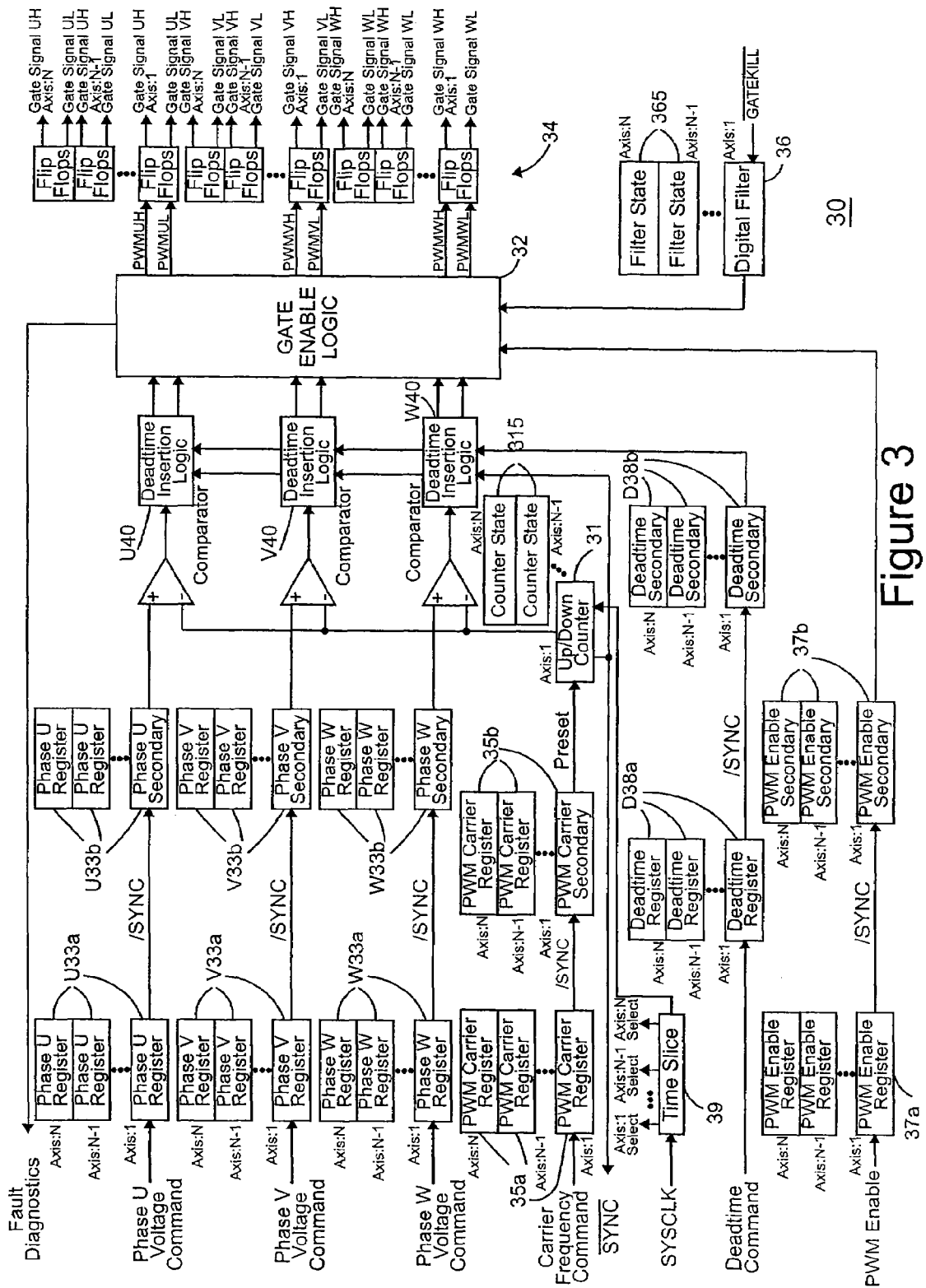
FIG. 3 is a schematic block diagram of a multi-axis PWM unit according to the present invention.

Referring now to FIG. 3, a block diagram of the multi-axis PWM unit 30 is illustrated. PWM unit 30 provides high and low output switching signals for each of the phases U, V and W from a gate enable logic block 32. Each of the high and low signals for each phase are delivered to a memory block that is preferably a flip-flop, generally designated in FIG. 3 as flip-flops 34. As high and low output signals for each of the designated motor phases are output, the signals are directed to a particular flip-flop set determined by the selected axis. For example, when axis 1 is selected, high and low phase signals are delivered to three flip-flop devices, one for each phase, associated with axis 1. When axis 2 is selected, the high and low signals for each phase is delivered to three flip-flops associated with axis 2. Preferably, there are N axes and three flip-flops associated with each axis to store the high and low signals for each of the three servo motor phases. The axes are preferably selected sequentially, so that axes 1–N are selected in turn to permit the associated three flip-flops to each receive a high and low signal associated with the specified motor phase in the selected axis control. After axis N is selected and the three flip-flops are loaded with the associated high and low signals for each of the three phases, axis 1 is selected next so that the three flip-flops associated with axis 1 are loaded, and so forth in a cycle sequence.

Gate enable logic 32 receives an input from a digital filter 36 that has a particular digital filter state for each of the axes 1–N. As each axis is selected, the filter state is loaded into the digital filter to provide the appropriate signal conditioning for the PWM signals output from gate enable logic 32.

Gate enable logic also receives an input from a PWM enable circuit consisting of a first PWM enable register 37a and a secondary PWM enable register 37b. Multiple PWM enable registers 37a, 37b are provided, one set for each axis, to receive the specific PWM enable signal corresponding to the desired axis. Each of the first PWM enable registers 37a are aligned with and correspond with each of the PWM enable secondary registers 37b for each of the axes. Accordingly, as a PWM enable signal is synchronously transferred from the first PWM enable register 37a of axis 1, it is received by the PWM enable secondary register 37b of axis 1. The same synchronous transfer is true of each of the axes 1–N. Accordingly, the appropriate PWM enable secondary register 37b delivers the PWM enable signal to gate enable logic 32 at the appropriate time to permit passage of the PWM signals for the three phases of the motor for the specified axis.

Turning to the phase voltage command for each of the phases U, V and W, a primary and secondary register is provided for each of the phases, with a number of primary and secondary registers provided to match the number of axes in the multiple axis system. Accordingly, for phase U, primary registers U33a are provided with a primary register U33a assigned to each axis for the phase U voltage command. Secondary registers U33b are also provided to match the number of axes in the multiple axis control. The phase U voltage command is input to the selected primary register U33a for the selected axis, and the value of the selected primary register U33a for phase U is synchronously transferred to secondary register U33b for the selected axis. Accordingly, when axis 1 is selected, the phase U voltage command is applied to the primary register U33a associated with axis 1, while the value from the primary register U33a of axis 1 is transferred synchronously to the secondary register U33b of axis 1. After the operations for axis 1 are completed, axis 2 is selected and the transfers associated with the phase U voltage command for registers U33a and U33b are completed during the period of time that axis 2 is selected. These operations likewise occur for command transfer in phases V and W with registers V33a, V38b and W33a, W33b, respectively.

PWM unit 30 cycles through each of the axes 1–N until each of the primary and secondary registers U33a, U33b have been serviced with the appropriate phase U voltage command, at which point axis 1 is selected and the process begins again. The same activities occur on the V and W phases for delivering the V and W voltage commands to the associated primary and secondary registers V33a, V33b and W33a, W33b for each of the selected axes. Similarly, primary and secondary registers 35a, 35b are used to store the carrier frequency command for each of the selected axes, which is input to the up/down counter 31, which is loaded with the particular counter state 31s for the selected axis.

The system clock signal SYSCLK input to time slice block 39 determines the selection signals for axes 1–N, which are used to select the primary and secondary registers loaded with the separate phase voltage commands, the flip-flops for receiving the PWM high and low signals for each phase, the filter state 36s to be loaded into digital filter 36 and all the other parameters and registers associated with the selected axis. Because the selection signals are preferably implemented in hardware, the latency between selecting the components associated with the selected axis is reduced over the same system in software.

As with the other primary and secondary registers, a deadtime command specific to each axis is loaded into deadtime primary and secondary registers D38a and D38b, dependent upon the selected axis. The deadtimes specific to the selected axis are used in deadtime insertion logic blocks U40, V40 and W40 to generate the high and low signals for each of the three phases.

Gate enable logic 32 also provides an output for fault detection and diagnostic parameters. It should be apparent that the fault signals and diagnostic parameters delivered by gate enable logic 32 are specific to the selected axis associated with the high and low PWM signals transmitted by gate enable logic 32.

As discussed above, each axis is preferably selected based on a time slice of the system clock signal SYSCLK. When a particular axis is selected by time slice block 39, the associated registers are connected in PWM unit 30. This control mechanism is realized in hardware to speed operation of the multi-axis control and reduce delays that would otherwise be associated with implementing PWM unit 30 in software. Because the system clock frequency is set at a high rate, a number of axes may be implemented in the time slice control mechanism.

The host system can provide phase voltage commands directly to the controller implementing PWM unit 30, so that no extensive multi-axis network is needed. Accordingly, implementation of PWM unit 30 eliminates the restrictive network architecture between a host system and multiple independent servo motor drives for independent axis control.

Because a multi-axis control can be implemented with PWM unit 30, a single closed loop current control can be used for the multiple axes, as well as a single velocity control loop to support multiple AC servo motor drive axes. For example, the current feedback signals from the inverter drives of each axis can be selectively read by a controller implementing PWM unit 30 to perform all relevant calculations for the selected axis. Likewise, a position control can be read for a selected axis from the associated encoder to provide velocity control for each axis based on the time slice multi-tasking control mechanism of the present invention.

As discussed above, a multiple axis servo motor controller that implements PWM unit 30 realizes a number of advantages over the independent axis controllers in conventional multi-axis servo controls. Another advantage permitted by the implementation of PWM unit 30 is reduced susceptibility to noise and EMI signals, since a single control unit can be more easily shielded and compensated for noise and EMI signals than can a series of servo motor drive controllers interconnected with a control network to a host computer. In addition to reducing susceptibility to noise and EMI, the controller implementing PWM unit 30 is less expensive, takes up less space, and simplifies a multi-axis control by removing redundant components and interfaces.

Figure 4:
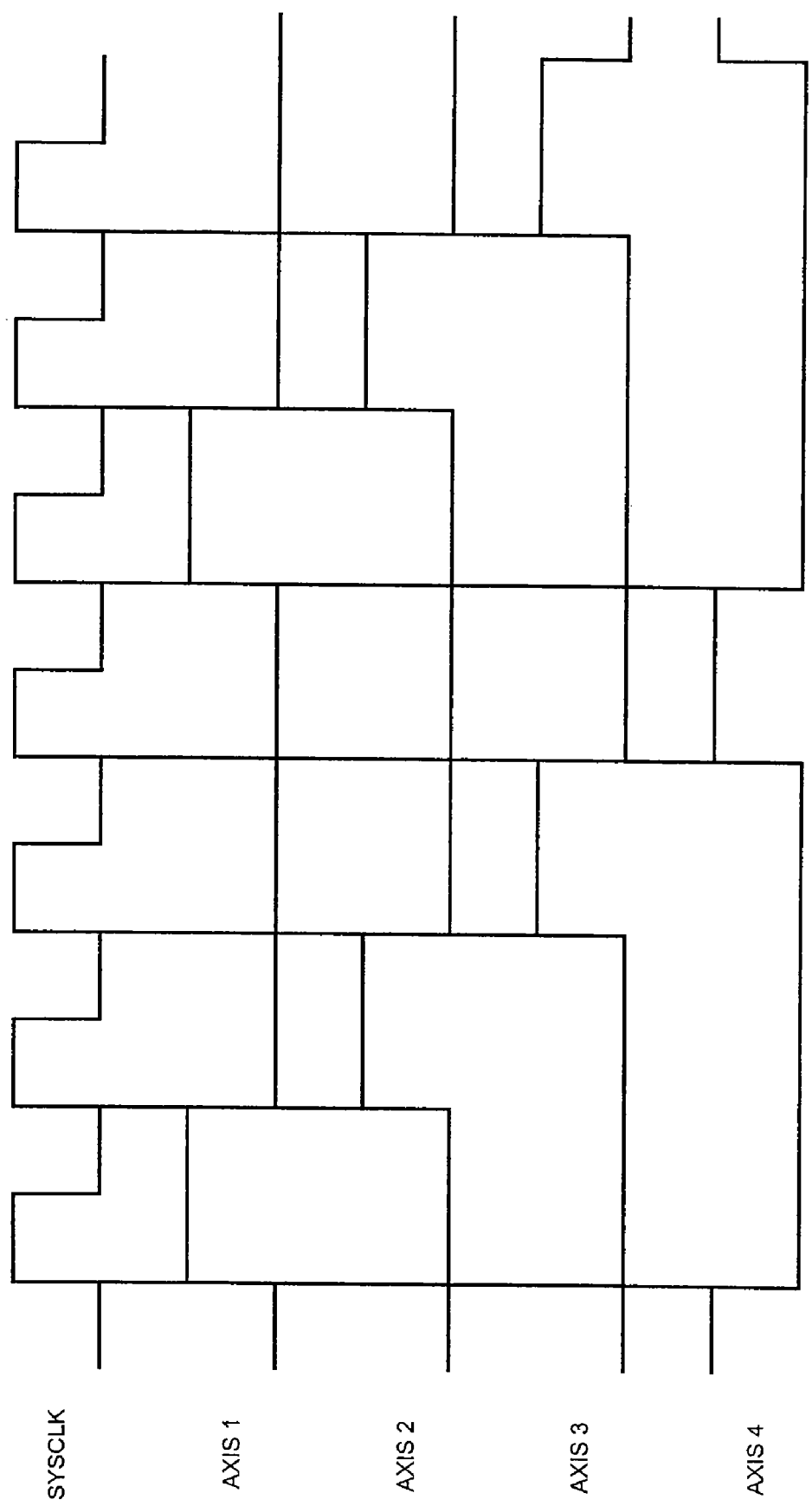
FIG. 4 is a timing diagram illustrating time slicing for multiple axis control according to the present invention.

Referring now to FIG. 4, a timing diagram illustrating axis selection based on system clock signal SYSCLK timing is illustrated. In the timing diagram of FIG. 4, each axis 1–4 is sequentially selected for a period of the SYSCLK signal. After axes 1–4 have been sequentially selected in consecutive system clock cycles, the cycle repeats and each axis is again selected with the ensuing system clock signal period. When each axis is selected the appropriate connections are made to connect the registers associated with that axis to the input phase voltage commands, carrier frequency command, deadtime command, PWM enable signal, up/down counter states, digital filter states and associated PWM signal flip-flops. Preferably, the connections for each of the axis specific registers and other devices are made during the time the axis is selected, and data transfers are carried out within the axis selection time frame.

Experiments carried out with a multi-axis servo controller implementing PWM unit 30 according to the present invention provide real time control for up to eight AC servo motor drive axes. However, it is contemplated that any number of practical multiple axis servo motor drive controls can be implemented in accordance with the present invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A multiple axis servo motor drive control system for providing coordinated three-dimensional position control of a moving object, comprising:

a host system for supplying multi-axis servo control commands, wherein said PWM signals define said coordinated three-dimensional position control;

a processor coupled to the host system for receiving the multi-axis servo control commands, the processor having a PWM control unit for producing PWM signals on the basis of the servo motor control commands, wherein said PWM signals define said coordinated three-dimensional position control;

the PWM control unit comprising a time slice selection unit for generating a plurality of axis selection signals to select components related to a selected axis in the multi-axis control;

said PWM control unit being operable to provide multiple sets of PWM signals to thereby supply a respective set of PWM signals to a motor drive for the selected axis; and the respective set of PWM signals produced by the PWM control unit for said selected axis being selected on the basis of said axis selection signals.

2. The system according to claim 1, said PWM control unit further comprising a plurality of carrier storage elements associated with a carrier frequency command, the carrier storage elements being selectable to be coupled to the carrier frequency command based on the axis selection signals.

3. The system according to claim 1, said PWM control unit further comprising a counter device for influencing the PWM control output, the counter device being selectively loaded with a counter state associated with the selected axis in accordance with the axis selection signals.

4. The system according to claim 1, said PWM control unit further comprising a plurality of gate signal storage elements associated with the motor phase, the gate signal storage elements being selectable to be coupled to the PWM control output for the motor phase based on the axis selection signals.

5. The system according to claim 1, said PWM control unit further comprising:
 a digital filter coupled to the PWM control output for influencing the PWM control output in accordance with a state of the digital filter; and
 a plurality of filter state elements being selectable to be loaded into the digital filter based on the axis selection signals to influence the related PWM control output for the selected axis.

6. The system according to claim 1, said PWM control unit further comprising a plurality of PWM enable storage elements associated with a PWM enable signal, the PWM enable storage elements being selectable to be coupled to the PWM enable signal based on the axis selection signals.

7. The system according to claim 1, said PWM control unit further comprising a plurality of deadtime storage elements associated with a deadtime conimand, the deadtime storage elements being selectable to be coupled to the deadtime command based on the axis selection signals.

8. The motor drive system according to claim 1, wherein:
 the PWM control unit further comprises a plurality of storage elements for storing motor drive command signals for a plurality of motor phases of said plurality of axes, a respective set of storage elements for said plurality of axes being associated with each motor phase; and
 said set of storage elements being selectively coupled to the motor drive command signals on the basis of said axis selection signals.

9. A method in a multi-axis servo motor drive control for producing PWM signals which define coordinated three-dimensional position control of a moving object, comprising the steps of:
 generating multi-axis servo control commands;
 receiving the multi-axis servo control commands and producing PXM signals which define said coordinated 3-D position control on the basis of the servo motor control commands;
 selecting a time slice for generating a plurality of axis selection signals for selecting components related to a particular axis in the multi-axis control;
 supplying a respective set of PWM signals to a motor drive for the particular axis; and
 selecting the respective set of PWM signals produced by the PWM control unit for said particular axis on the basis of said axis selection signals.

10. The method according to claim 9, further comprising selectively coupling a plurality of carrier storage elements to a carrier frequency command based on the axis selection signals.

11. The method according to claim 9, further comprising loading a counter device with a counter state on the basis of the axis selection signals; and
 combining an output of the counter with the PWM control output to produce a motor phase control signal on the basis of the axis selection signals.

12. The method according to claim 9, further comprising selectively coupling a plurality of motor phase drive command storage elements to the PWM control output for the motor phase based on the axis selection signals.

13. The method according to claim 9, further comprising selectively loading a digital filter with a filter state based on the axis selection signals.

14. The method according to claim 9, further comprising selectively coupling a plurality of PWM enable storage elements to a PWM enable signal based on the axis selection signals.

15. The method according to claim 9, further comprising selectively coupling a plurality of deadtime storage elements to a deadtime command signal based on the axis selection signals.

16. The method according to claim 9, further comprising selectably coupling storage elements each corresponding to a respective axis and associated with a motor phase to a motor phase command signal based on the axis selection signals; and
 outputting from the storage elements a PWM control output for driving the motor phase for the selected axis.

* * * * *